United States Patent
Han et al.

(10) Patent No.: US 8,281,200 B2
(45) Date of Patent: Oct. 2, 2012

(54) METHOD AND DEVICE FOR RETRANSMITTING DATA

(75) Inventors: Xin Han, Shenzhen (CN); Yingzhe Ding, Shenzhen (CN); Linhong Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 982 days.

(21) Appl. No.: 12/180,456

(22) Filed: Jul. 25, 2008

(65) Prior Publication Data

US 2008/0301516 A1    Dec. 4, 2008

Related U.S. Application Data

(63) Continuation of application No. PCT/CN2007/000306, filed on Jan. 26, 2007.

(30) Foreign Application Priority Data

Jan. 26, 2006 (CN) .......................... 2006 1 0002630

(51) Int. Cl.
*G06F 11/00* (2006.01)
(52) U.S. Cl. ....................................... 714/748; 714/749
(58) Field of Classification Search .................. None
See application file for complete search history.

(56) References Cited

U.S. PATENT DOCUMENTS

| | | | | |
|---|---|---|---|---|
| 8,051,353 B2 * | 11/2011 | Maas et al. | ..................... | 714/748 |
| 2003/0099211 A1 | 5/2003 | Moulsley et al. | | |
| 2008/0209297 A1 * | 8/2008 | Chandra et al. | ............... | 714/748 |
| 2009/0150738 A1 * | 6/2009 | Nishio et al. | .................. | 714/749 |

FOREIGN PATENT DOCUMENTS

| | | |
|---|---|---|
| CN | 1142271.8 | 2/1997 |
| CN | 1411187 A | 4/2003 |
| CN | 1411244 A | 4/2003 |
| CN | 1431784 A | 7/2003 |
| CN | 1431839 A | 7/2003 |
| CN | 101009538 B | 10/2011 |
| EP | 1 326 397 A2 | 12/2002 |
| WO | 03034643 A1 | 4/2003 |
| WO | WO 03/096567 A1 | 11/2003 |
| WO | 2005/006640 A1 | 1/2005 |

OTHER PUBLICATIONS

Herrmann et al., "Improving Packet Loss Probability in the UMTS High-Speed Downlink," *IEEE Vehicular Technology Conference*, 4:2655-2659 (Oct. 2003).
Second Office Action in counterpart Chinese Application No. 200610002629.5, mailed Jan. 29, 2010.

(Continued)

*Primary Examiner* — Michael Maskulinski
(74) *Attorney, Agent, or Firm* — Leydig, Voit & Mayer, Ltd.

(57) ABSTRACT

A method and device for retransmitting data is provided. A receiving end receives a data unit, and checks whether a Negative Acknowledgement NACK->Acknowledgement, ACK, error occurs. If the NACK->ACK error occurs, the receiving end transmits an Automatic Repeat Request ARQ request message to a transmitting end, for requesting the transmitting end to perform an ARQ retransmission. Therefore, by adopting the technical solutions of the embodiment of the invention, Hybrid Automatic Repeat Request HARQ NACK->ACK errors are avoided from being missed, the complexity of ARQ operation is lowered, and the ARQ retransmission feedback time is reduced.

11 Claims, 4 Drawing Sheets

OTHER PUBLICATIONS

Rejection Decision in counterpart Chinese Application No. 200610002629.5, mailed Jul. 15, 2010.

"3rd Generation Partnership Project; Technical Specification Group Radio Access Network; Medium Access Control (MAC) protocol specification (Release 6)," *3GPP*, 3GPP TS 25.321 V6.4.0 (Mar. 2005).

"3rd Generation Partnership Project; Technical Specification Group Radio Access Network; Radio Link Control (RLC) protocol specification (Release 6)," *3GPP*, 3GPP TS 25.322 V6.4.0 (Jun. 2005).

"3rd Generation Partnership Project; Technical Specification Group Radio Access Network; Radio Interface Protocol Architecture (Release 6)," *3GPP*, 3GPP TS 25.301 V6.3.0 (Jun. 2005).

Samsung, "MAC Function: ARQ," *3rd Generation Partnership Project (3GPP)*, TSG-RAN2 Meeting #50, Tdoc R2-060077 (Jan. 2006).

English Translation of Written Opinion for International Patent Application No. PCT/CN2007/000306.

International Search Report in corresponding PCT Application No. PCT/CN2007/000306 (Apr. 26, 2007).

* cited by examiner

METHOD AND DEVICE FOR RETRANSMITTING DATA

CROSS REFERENCE TO RELATED APPLICATIONS

This application is a continuation of International Patent Application No. PCT/CN2007/000306, filed Jan. 26, 2007, which claims priority to Chinese Patent Application No. 200610002630.8, filed Jan. 26, 2006, both of which are hereby incorporated by reference in their entirety.

FIELD OF THE INVENTION

The present invention relates to the field of radio communication technology, and more particularly to method and device for retransmitting data.

BACKGROUND

High Speed Downlink Packet Access, HSDPA, is a technique for accessing downlink data packets in a high speed. The HSDPA system has the following characteristics. 2 ms short frame is adopted, a physical layer Hybrid Automatic Repeat Request, HARQ, technique and an Adaptive Modulation and Coding, AMC, technique are adopted in the physical layer, 16-Duadrature Amplitude Modulation, 16QAM, is introduced to perform high-order modulation to improve spectrum utilization, and code division and time division are adapted to realize shared channel scheduling on each User Equipment, UE.

The HARQ technique adopts Stop-And-Wait, SAW, protocol, in which after data is transmitted by a base station to the UE, the UE is required to feed back Acknowledgement/Negative Acknowledgement, ACK/NACK, and the base station can acquire whether the UE has correctly received the data according to the ACK/NACK, so as to determine whether to retransmit the data to the UE or to transmit new data to the UE.

In HSDPA, two physical channels, namely, High Speed Shared Control Channel, HS-SCCH, and High Speed Physical Downlink Shared Channel, HS-PDSCH, are added to the downlink. The HS-SCCH is adapted to bear the required signaling for demodulating the associated data channel HS-PDSCH, and the HS-PDSCH is adapted to bear data information of the user.

In HSDPA, a physical channel, namely, a High Speed-Dedicated Physical Control Channel, HS-DPCCH, is added to the uplink. The channel is adapted to bear the information fed back by the user about whether the downlink data frame HS-PDSCH is correctly received, i.e. the ACK/NACK, or is adapted to bear a Channel Quality Indication, CQI.

Meanwhile, in the HSDPA system, a Medium Access Control-high speed, MAC-hs, entity is added to a Medium Access Control, MAC, layer for supporting the flow control of the HSDPA, performing quick scheduling/priority management, HARQ, and transport format and resource indicator, TFRI, selection.

In Wideband Code Division Multiple Access, WCDMA, network structure, the MAC layer, a Radio Link Control, RLC, layer, and other upper layers are located above the physical layer, the physical layer and a part of the MAC entity of the HSDPA are located in the base station, the RLC layer and the entities over the RLC layer are located in a Radio Network Control, RNC, and the base station and the RNC has a standard interface data transmission manner there-between.

Before the physical layer HARQ retransmission is introduced into the WCDMA system, the system ensures the correct transmission of the service data by the ARQ retransmission of the RLC layer and the retransmission of the upper layers. After the HARQ physical layer retransmission is introduced into the WCDMA system, when the physical layer retransmission times reaches maximum retransmission times given by the system, but the physical layer still does not correctly receive the data, the RLC layer of the receiving end requests an Automatic Repeat Request, ARQ, retransmission according to a Serial Number, SN, state of a received Protocol Data Unit, PDU. Once receiving the request, the transmitting end starts the ARQ retransmission.

The detailed retransmission process includes the following steps:

1. The RLC layer of the transmitting end divides or combines the data unit transmitted by the upper layer to generate the appropriate RLC Acknowledgement Mode Data, AMD, PDU, and numbers and transmits the RLC AMD PDU to the physical layer of the transmitting end, and buffers the RLC AMD PDU in the retransmission buffer area.

2. After processing the received data unit, the physical layer of the transmitting end transmits the data unit to the physical layer of the receiving end, and the transmitting end waits for the HARQ feedback information transmitted by the receiving end.

3. The receiving end feeds back whether each data unit is correct to the transmitting end. If the data unit is correct, the receiving end feeds back the HARQ ACK to the transmitting end, and delivers the data to the RLC of the receiving end, and if the data unit is incorrect, the receiving end feeds back HARQ NACK to the transmitting end.

4. The transmitting end determines whether to perform the HARQ retransmission according to the HARQ feedback information, the maximum retransmission times, and other information. If the HARQ maximum retransmission times is not exceeded, the retransmission continues, otherwise, the transmitting end terminates the HARQ retransmission and waits for an Automatic Repeat Qequest, ARQ, retransmission of the RLC.

5. The RLC layer of the receiving end determines whether the RLC AMD PDU requires the ARQ retransmission according to the received data, the timer, and other information, and feeds back an ARQ STATUS REPORT to the RLC of the transmitting end.

6. The RLC of the transmitting end determines whether to initiate the ARQ retransmission according to the received STATUS REPORT and the local information, and the retransmission step is the same as the above.

In the above RLC ARQ retransmission solution, in order to determine the transmission time and the content of the STATUS REPORT, a great number of timers and counters are configured in the RLC. The message format of the STATUS REPORT includes BITMAP, LIST, and RLIST, and the triggering mechanism includes a timing report and an error report, and the operation process is quite complex.

In addition, the process of feeding back the BITMAP information to the transmitting end by the receiving end is finished on the RLC layer, particularly for the ARQ retransmission. If the RLC of the receiving end determines that data loss occurs, for example according to the SN, the RLC of the receiving end transmits the STATUS REPORT for requesting the data retransmission. Then, at the transmitting end, the RLC must detect the STATUS REPORT transmitted by the receiving end on the RLC layer, so as to determine whether an RLC AMD PDU requires the retransmission, and therefore, the process takes much time.

In order to eliminate the disadvantages of the above technical solution, the prior art provides a new two-layer retransmission mechanism. Under the mechanism, the problems which may not be solved by the HARQ retransmission still must be solved by the ARQ retransmission, but the detailed retransmission process is changed. The detailed process is as shown in FIG. 1, which includes the following steps:

1. 101a, 101b and 101c: The RLC of the transmitting end divides or combines the data transmitted by the upper layer to generate the appropriate data unit PDU, then delivers the data unit PDU to the lower layer for transmission, and buffers the data unit PDU in the retransmission buffer area.

2. 102a, 102b and 102c: After processing the data unit, the lower layer of the transmitting end transmits the data unit to the receiving end and waits for HARQ acknowledgement of the receiving end.

3. The receiving end performs the HARQ feedback on each received data unit. If the data unit is correct, the receiving end feeds back the HARQ ACK to the lower layer of the transmitting end 103c. and transmits the data to the RLC of the receiving end. 103a: If the data unit is incorrect, the receiving end feeds back the HARQ NACK to the lower layer of the transmitting end. 104a: After receiving the HARQ NACK, the lower layer of the transmitting end determines whether the HARQ maximum retransmission times are reached. If the HARQ maximum retransmission times are not reached, the process returns to Step 2 to transmit the PDU to the receiving end again. 105a: If the HARQ maximum retransmission times is reached, the lower layer of the transmitting reports the local NACK to the RLC of the transmitting end.

4. After the RLC of the transmitting end receives the local NACK, the transmitting end starts the ARQ retransmission process of the data unit.

103b: In the above process, if the lower layer of the receiving end finds the HARQ NACK/Discontinuous Transmission, DTX->ACK error, that is, the HARQ NACK signaling fed back by the receiving end to the transmitting end is changed to the HARQ ACK signaling during the transmission process, or the transmitting end detects the HARQ ACK signaling by mistake under a situation that the receiving end does not feed back the HARQ. 104b: The receiving end transmits an error indication information of HARQ NACK/DTX->ACK to the lower layer of the transmitting end. 105b: After receiving the indication, the lower layer of the transmitting end reports the local NACK to the RLC of the transmitting end (upper layer).

After receiving HARQ ACK of the receiving end, the lower layer of the transmitting end determines whether to transmit the local ACK to the RLC of the transmitting end according to the timer. 104c: If the error indication information of NACK/DTX->ACK transmitted by the receiving end is not received when the preset time duration is exceeded, it is considered that the receiving end correctly receives the data in deed. 105c: The lower layer of the transmitting end transmits the local ACK to the RLC of the transmitting end.

In the above retransmission solution, the ARQ feedback signaling of the upper layer is assisted by the lower layer, which lowers the complexity of operation of the upper layer, meanwhile, the assistant signaling transmitted by the lower layer also reduces the retransmission feedback time. However, the technical solution has a problem of missing the HARQ NACK/DTX->ACK error. The reason is that the lower layer of the transmitting end must determine whether the HARQ maximum retransmission times is reached according to the number of the received HARQ NACK, so as to determine whether to report the ARQ local NACK to the upper layer. Further, the receiving end determines whether the HARQNACK/DTX->ACK error occurs, the determination is made under the situation that the new data is received before the HARQ maximum retransmission times is reached. Therefore, if the HARQ NACK/DTX->ACK occurs during the final HARQ retransmission process, the lower layer of the receiving end may not find the HARQ NACK/DTX->ACK error, and may not transmit the error indication information of HARQ NACK/DTX->ACK to the transmitting end, such that the lower layer of the transmitting end considers that the data is correctly transmitted, the transmitting end transmits the local ACK to the upper layer of the transmitting end, the upper layer of the transmitting end deletes the data from the retransmission buffer area. Therefore, the data may not be retransmitted, and the receiving end may not receive the data through the ARQ retransmission, thus resulting in an error which cannot be corrected.

SUMMARY

The embodiments of the present invention provide a method and device for retransmitting data, capable of preventing from missing HARQ NACK/DTX->ACK errors, lowering the complexity of an upper layer ARQ operation, and reducing ARQ retransmission feedback time.

The embodiment of the present invention is realized through the technical solutions as follows.

According to an embodiment, a method for retransmitting data includes the following steps: receiving, by a receiving end, a data unit; determining, by the receiving end, whether a Negative Acknowledgement NACK->Acknowledgement ACK error occurs; and transmitting, by the receiving end, an Automatic Repeat Request ARQ request message to a transmitting end for requesting the transmitting end to perform an ARQ retransmission if the NACK->ACK error occurs.

According to an embodiment, a device for retransmitting data includes: a retransmission determining module configured in a receiving end, and adapted to determine whether a Negative Acknowledgement NACK->Acknowledgement ACK error occurs in a received data unit, and notify a triggering upper layer retransmission module when the NACK->ACK error occurs; and a triggering upper layer retransmission module, adapted to transmit an Automatic Repeat Request, ARQ, request message to a transmitting end after receiving a notification from the retransmission determining module.

It may be known from the technical solutions provided by the embodiment of the present invention that the method and the device provided have the following advantages:

1. If the receiving end receives the incorrect data, and it is determined that the HARQ retransmission threshold is reached, the receiving end instructs the transmitting end to start the ARQ retransmission, and therefore during the final HARQ retransmission process, the HARQ NACK/DTX->ACK may not occur and the data retransmission is not affected.

2. A lower layer of the receiving end checks whether the HARQ retransmission threshold is reached, and instructs an upper layer of the receiving end to start the ARQ retransmission when the HARQ retransmission threshold is reached, which lowers the complexity of the upper layer ARQ operation, and reduces determination time of the upper layer, so as to reduce the retransmission feedback time.

BRIEF DESCRIPTION OF THE DRAWINGS

The present invention may become more fully understood from the detailed description given herein below for illustration only, and thus is not limitative to the present invention, and wherein.

DETAILED DESCRIPTION

The embodiments of the present invention provide a method for retransmitting data. During the data transmission process, a lower layer of the receiving end checks whether an NACK->ACK error occurs. If it is determined that the NACK->ACK error occurs, the receiving end transmits an ARQ request message to a transmitting end, for triggering the transmitting end to perform an ARQ retransmission process.

In the embodiment of the present invention, the NACK->ACK error is an HARQ NACK/DTX->ACK error, which includes that the receiving end receives a received old data unit which is still incorrect, and a preset HARQ retransmission threshold is reached, or the receiving end receives a non-received new data unit, but a previous data unit is not correctly received, and the preset HARQ retransmission threshold is not reached.

The HARQ retransmission threshold includes preset HARQ maximum retransmission times or preset HARQ maximum retransmission time.

A detailed description is given with the accompanying drawings as follows:

Solution 1: An upper layer resource control module, for example, a Radio Resources Control, RRC, determines the maximum retransmission times of HARQ in the lower layer of the transmitting end and the receiving end and ARQ in the upper layer of the receiving end and the transmitting end, respectively. The receiving end provides a counter for each HARQ process number, for counting retransmission times. The transmitting end provides a timer for each HARQ process number, for counting the time of the transmitted data. If a preset duration of the timer is exceeded, and an assistant ARQ retransmission message generated by the receiving end through the HARQ is still not received, it is determined that the data is correctly received. Assuming that the preset HARQ maximum retransmission times is N, the counter is reset each time when a new data transmission starts, and a count value is set to be N. If the received data is incorrect, an HARQ NACK message representing that the data unit is incorrect is transmitted. If the value of the counter is greater than 0, 1 is subtracted from the count value of the counter. Therefore, when the HARQ maximum retransmission times is reached and the data is still incorrect, the count value of the counter is −1, at this time, the assistant ARQ request message generated through the HARQ is transmitted to the transmitting end, for triggering the ARQ retransmission process. Alternatively, after finding the HARQ NACK/DTX->ACK error, the receiving end HARQ transmits the assistant ARQ request message generated through the HARQ to the transmitting end, so as to trigger the ARQ retransmission process. After the HARQ of the receiving end determines that the received data unit is correct, the receiving end HARQ transmits the data unit to an upper layer RLC of the receiving end, and notifies the transmitting end that the data is correctly received.

Figure 1:
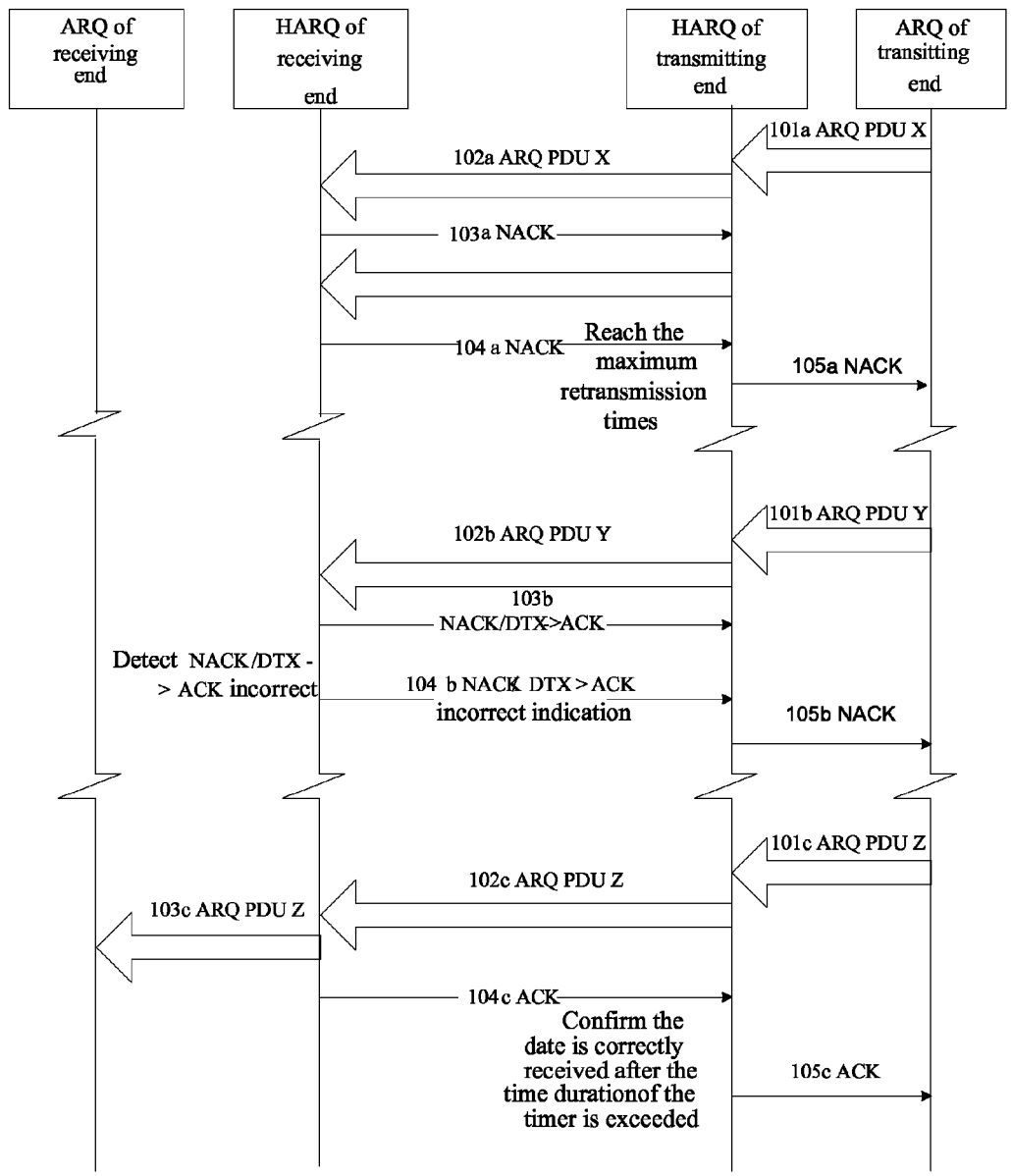
FIG. 1 shows a flow chart of a two-layer retransmission method.
Figure 2:
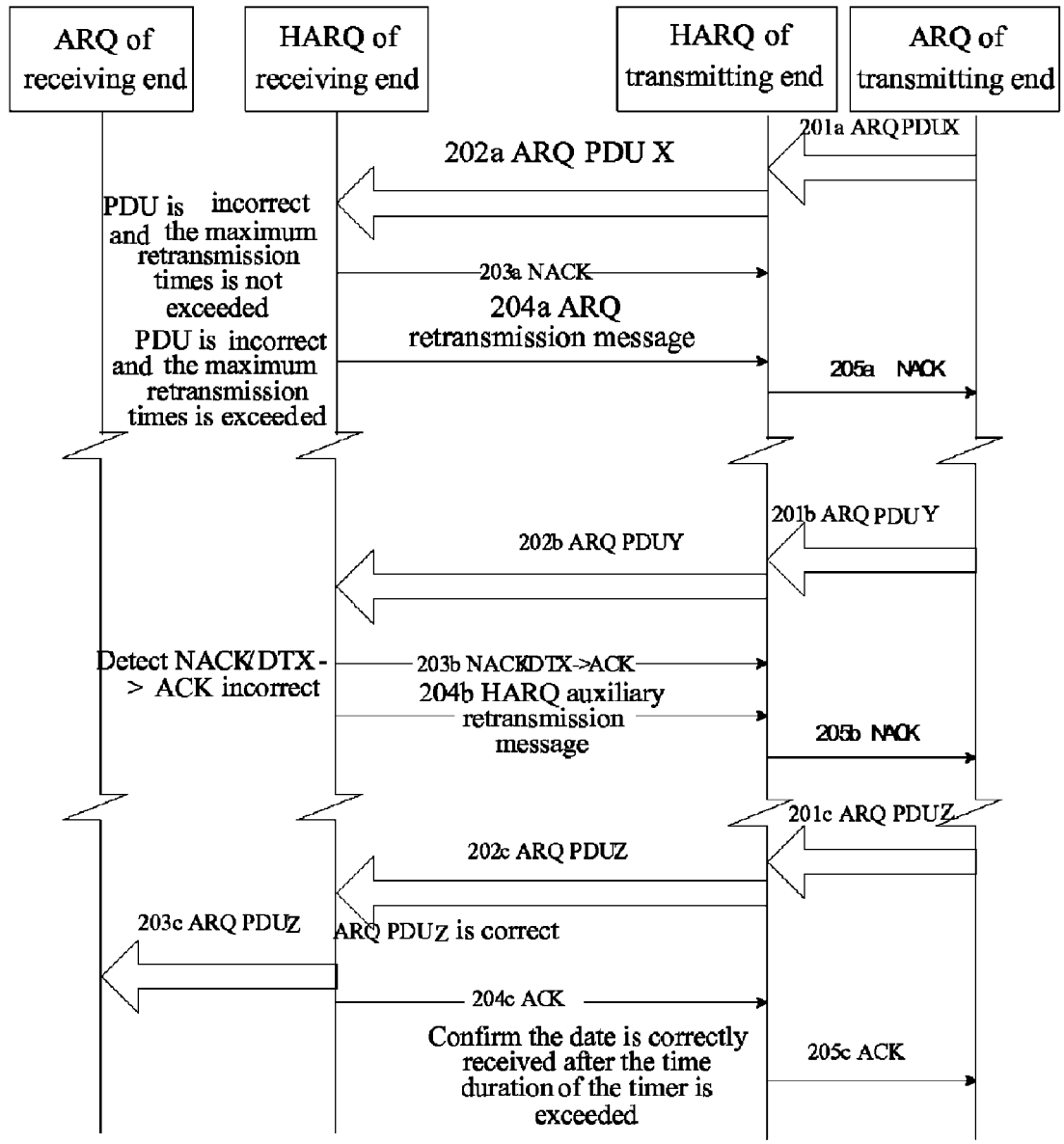
FIG. 2 shows a flow chart of the data retransmission according to a first embodiment of the method of the present invention.

A specific embodiment of the solution 1 is as shown in FIG. 2. As shown in FIG. 2, the detailed flow includes:

201*a*: An ARQ entity of the transmitting end sends an ARQ PDU X to an HARQ entity of the transmitting end.

202*a*: The HARQ entity of transmitting end transmits the ARQ PDU X to the HARQ entity of the receiving end.

203*a*: The HARQ entity of receiving end detects the PDU X is incorrect and the HARQ maximum retransmission times is not exceeded, the HARQ entity of the receiving end feeds back an NACK to the HARQ entity of transmitting end.

204*a*: The HARQ entity of the receiving end detects the PDU X is incorrect and the HARQ maximum retransmission times is exceeded. The HARQ entity of the receiving end feeds back an ARQ retransmission information to the HARQ entity of the transmitting end.

205*a*: The HARQ entity of the transmitting end notifies the ARQ entity of the transmitting end of the NACK.

201*b*: The ARQ entity of the transmitting end sends an ARQ PDU Y to the HARQ entity of the transmitting end.

202*b*: The HARQ entity of the transmitting end transmits the ARQ PDU Y to the HARQ entity of the receiving end.

203*b*: The HARQ entity of the receiving end feeds back the NACK to the HARQ entity of the transmitting end, but the NACK is transformed to the ACK, or the DTX is transformed to the ACK.

204*b*: The HARQ entity of the receiving end detects an NACK/DTX->ACK error, the HARQ entity of the receiving end feeds back an HARQ assisted retransmission information to the HARQ entity of the transmitting end.

205*b*: The HARQ entity of the transmitting end notifies the ARQ entity of the transmitting end of the NACK.

201*c*: The ARQ entity of the transmitting end sends an ARQ PDU Z to the HARQ entity of the transmitting end.

202*c*: The HARQ entity of the transmitting end transmits the ARQ PDU Z to the HARQ entity of the receiving end.

203*c*: The HARQ entity of the receiving end detects the ARQ PDU is correct, then delivers the PDU to the ARQ entity of the receiving end.

204*c*: The HARQ entity of the receiving end feeds back the ACK to the HARQ entity of the transmitting end.

205*c*: The timer of the HARQ entity is exceeded, and the ARQ of the transmitting end is notified of the ACK.

The detailed process is described as follows:

The upper layer RLC of the transmitting end divides or combines the data delivered by the upper layer to generate an appropriate data unit, transmits the data unit to the lower layer of the transmitting end, and buffers the data unit in an ARQ retransmission buffer area. After the lower layer of the transmitting end correspondingly processes the data unit, the lower layer of the transmitting end transmits the processed data unit to the lower layer of the receiving end. Meanwhile, the timer starts to wait for the acknowledgement of the receiving end. If the assistant ARQ retransmission message generated through the HARQ and transmitted by the lower layer of the receiving end is still not received after the preset duration of the timer is exceeded, an ARQ ACK message is fed back to the upper layer of the transmitting end, for notifying the upper layer of the transmitting end that the data unit is correctly received.

The lower layer of the receiving end determines each received data unit, and correspondingly processes each data unit according to a determination result. A detailed operation process of the receiving end is given as follows.

After receiving the data unit, the lower layer of the receiving end firstly determines whether the received data unit is an old data unit, that is, a received data unit. If the received data unit is the old data unit, the lower layer of the receiving end continues to determine whether the data unit is correct, for example, by determining whether a Cyclic Redundancy Check, CRC, in the data unit is correct. If the CRC check is correct, it is determined that the data unit is correct, otherwise, it is determined that the data unit is incorrect.

If the data unit is incorrect, the receiving end continues to determine whether the HARQ maximum retransmission times is reached according to the corresponding count value of the HARQ counter.

If the count value of the HARQ counter is −1, the receiving end determines that the HARQ maximum retransmission time is reached. At this time, if an NACK message is transmitted to the transmitting end, the NACK message is tended to change to an ACK message, that is, the NACK->ACK error occurs. Therefore, at this time, the assistant ARQ retransmission message generated through the HARQ is transmitted to the transmitting end, and the counter is reset. After receiving the message, the transmitting end feeds back a local ARQ NACK to the transmitting end ARQ. After receiving the local ARQ NACK, the upper layer of the transmitting end determines whether to initiate the ARQ retransmission process according to the current ARQ retransmission times and the ARQ maximum retransmission times. If the ARQ maximum retransmission times is not reached, the ARQ retransmission process is initiated; otherwise, the ARQ retransmission is not initiated.

If the count value of the counter is greater than −1, the receiving end feeds back the HARQ NACK message to the transmitting end, instructs the transmitting end to retransmit the data unit, and 1 is subtracted from the count value of the counter. After receiving the HARQ NACK message, the transmitting end initiates the HARQ retransmission process, so as to retransmit the data unit to the receiving end.

If the old data unit received by the receiving end is correct, the lower layer of the receiving end delivers the data unit to the upper layer of the receiving end and the lower layer of the receiving end feeds back the HARQ ACK message to the transmitting end, and resets the counter. After the lower layer of the transmitting end receives the message, it is determined that the data is correctly received. The lower layer of the transmitting end feeds back the local ARQ ACK message to the upper layer of the transmitting end, and notifies the upper layer of the transmitting end that the data is correctly received.

If the data unit received by the receiving end is a new data unit, that is, a non-received data unit, the lower layer of the receiving end determines whether the data unit is correct, and meanwhile determines whether the HARQ NACK/DTX->ACK error occurs. If the counting value of the counter at this time is smaller than N, it is determined that the HARQ NACK/DTX->ACK error occurs. At this time, the lower layer of the receiving end transmits the assistant ARQ retransmission message generated through the HARQ to the transmitting end, so as to indicate the transmitting end to perform the ARQ retransmission on the previously transmitted data of the currently transmitted new data. After receiving the message, the lower layer of the transmitting end feeds back the local ARQ NACK message to the upper layer of the transmitting end. After receiving the local NACK message, the upper layer of the transmitting end determines whether to initiate the ARQ retransmission process according to the current ARQ retransmission times and the ARQ maximum retransmission times. If the ARQ maximum retransmission times is not reached, the ARQ retransmission process is initiated, otherwise, the ARQ retransmission process is not initiated. If the HARQ NACK/DTX->ACK error does not occur, the transmitting end continues to transmit a next data unit.

If the new data unit is correct, the data unit is delivered to the upper layer of the receiving end, and the lower layer of the receiving end feeds back the HARQ ACK message to the transmitting end, and resets the counter.

If the lower layer of the receiving end checks that the received data unit is a new data unit and is incorrect, the lower layer of the receiving end feeds back the HARQ NACK message to the transmitting end, instructs the transmitting end to perform the HARQ retransmission on the data unit, and 1 is subtracted from the count value of the counter. After receiving the HARQ NACK message, the transmitting end initiates the HARQ retransmission process, and retransmits the data unit to the receiving end.

In each solution in the embodiment of the present invention, the counter is configured for each HARQ process number, the initialization of each counter is executed during the first HARQ process, and the reset operation is executed when each HARQ process starts/ends.

Figure 3:
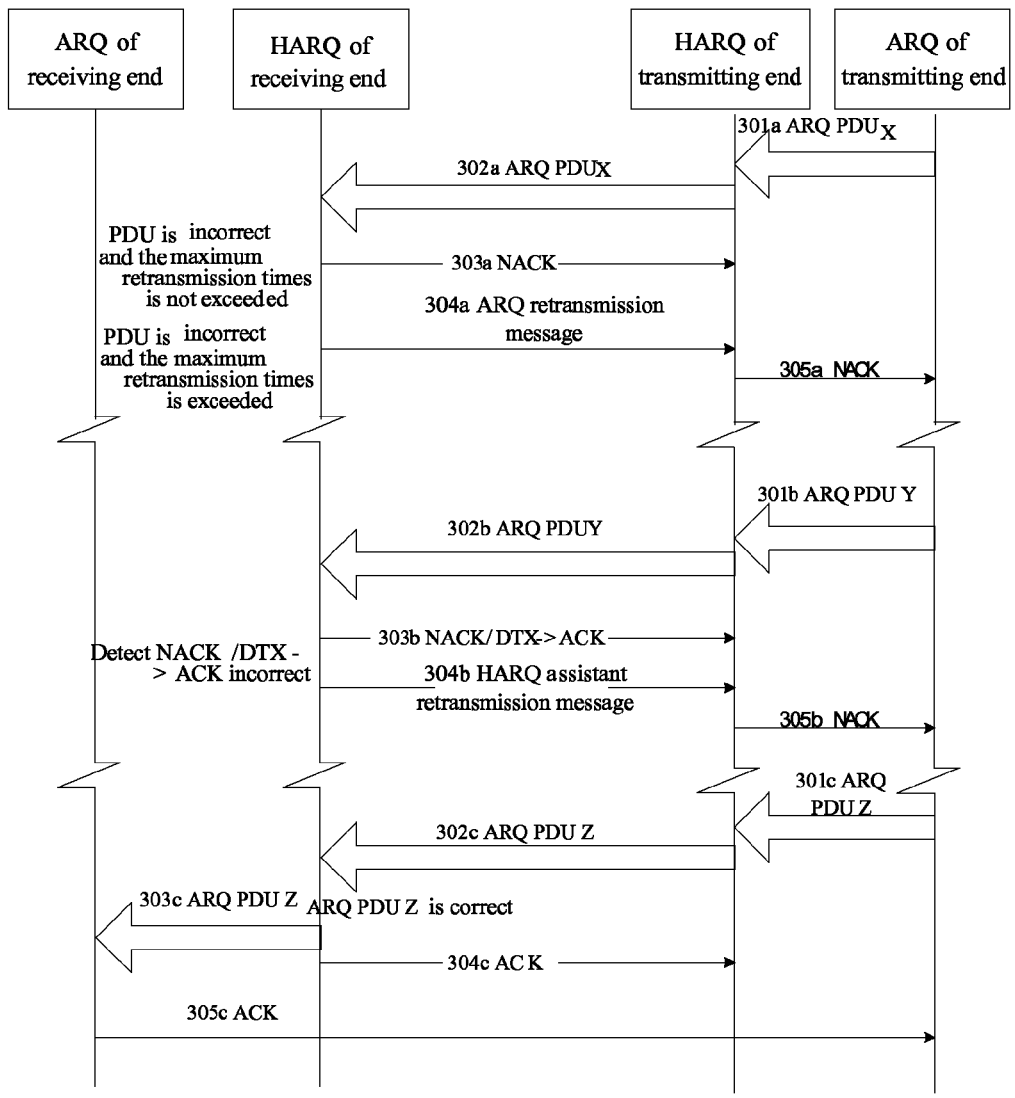
FIG. 3 shows a flow chart of the data retransmission according to a second embodiment of the method of the present invention.

Solution 2: In this solution, some modifications are made on the basis of the solution 1. The timer is not configured at the transmitting end for each HARQ process, and therefore, after the receiving end receives the correct data unit, the manner of feedback to the transmitting end is changed. The implementation process of a specific embodiment of the solution 2 is as shown in FIG. 3, in which 301a, 302a, 303a, 304a, 305a, 301b, 302b, 303b, 304b, 305b, 301c, 302c, 303c and 304c are the similar as 201a, 202a, 203a, 204a, 205a, 201b, 202b, 203b, 204b, 205b, 201c, 202c, 203c and 204c in FIG. 2. A difference is illustrated in 305c: The ARQ entity of the receiving end feeds back the ACK to the ARQ entity of the transmitting end. The differences between the solution 2 and the solution 1 are described as follows: After determining that the received data unit is correct, the lower layer of the receiving end delivers the data unit to the upper layer of the receiving end, the receiving end feeds back the HARQ ACK message to the transmitting end, notifies the transmitting end that the data unit is correctly received, and resets the HARQ counter. After receiving the data unit, the upper layer of the receiving end transmits the ARQ ACK message to the transmitting end according to the feedback algorithm. The feedback algorithm particularly includes the following steps:

After receiving the correct data unit, the upper layer of the receiving end immediately feeds back the ARQ ACK message to the upper layer of the transmitting end.

Alternatively, after receiving the correct data unit, the upper layer of the receiving end dose not feedback the ARQ ACK message to the upper layer immediately, but feeds back all the currently correctly received data units to the transmitting end after a period of time.

In the Solution 1, after the transmitting end receives the HARQ ACK message, if the ARQ retransmission message transmitted by the lower layer of the receiving end is still not received after the preset duration of the timer is exceeded, the transmitting end feeds back the ARQ ACK message to the upper layer of the transmitting end, and notifies the transmitting end that the data unit is correctly received. In order to ensure that the ARQ retransmission message is received, the preset duration needs to be longer. Therefore, in the solution 2, the required time that the upper layer of the receiving end transmits the ARQ ACK message to the upper layer of the transmitting end may be usually shorter than the preset duration, so that the transmission delay is reduced, and the upper layer of the transmitting end can delete the correctly received data unit in time, thus improving the rate of utilization of the buffer area of the upper layer of the transmitting end.

Figure 4:
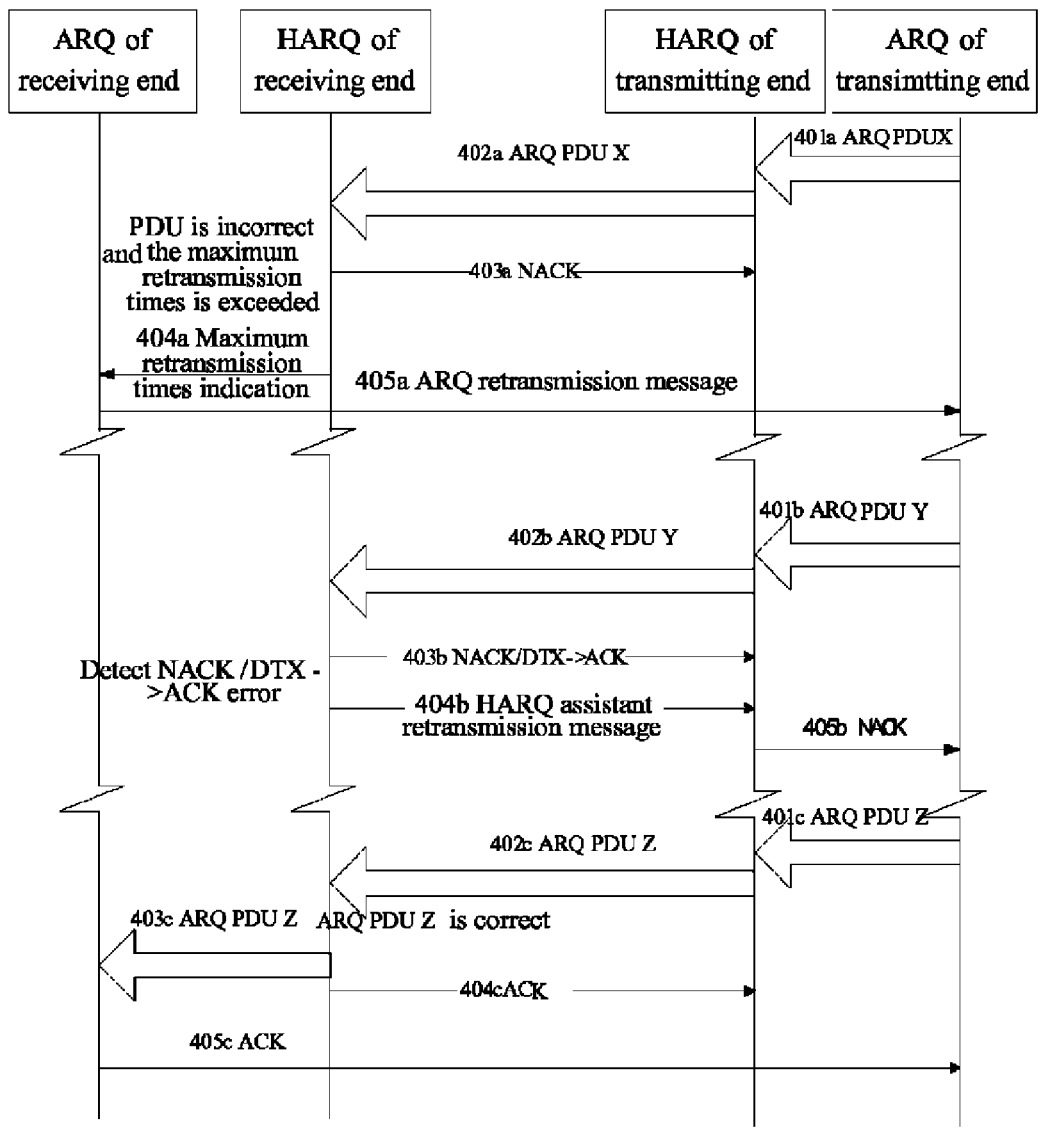
FIG. 4 shows a flow chart of the data retransmission according to a third embodiment of the method of the present invention.

Solution 3: When the receiving end determines that the HARQ maximum retransmission times is reached and the data is still incorrect, or after it is determined that the HARQ NACK/DTX->ACK error occurs, instead of generating the assistant ARQ retransmission message through the HARQ by the lower layer of the receiving end, the lower layer of the receiving end notifies the upper layer of the receiving end, and the upper layer of the receiving end directly notifies the upper layer of the transmitting end to perform the ARQ retransmission. The implementation process of a specific embodiment of the solution 3 is as shown in FIG. 4. As shown in FIG. 4, 401a, 402a, 403a, 401b, 402b, 403b, 404b, 405b, 401c, 402c, 403c, 404c and 405c are the similar as 301a, 302a, 303a, 301b, 302b, 303b, 304b, 305b, 301c, 302c, 303c, 304c and 405c in FIG. 3. The difference is illustrated in 404a and 405a.

404a: The HARQ entity of the receiving end notifies the ARQ entity of the receiving end of the maximum retransmission times.

405a: The ARQ entity of the receiving end sends retransmission information to the ARQ entity of the transmitting end.

The implementation process of the solution 3 is different from that of the Solution 1 or the Solution 2 in that, after receiving the data unit, the lower layer of the receiving end determines that the data unit is the old data unit, the HARQ maximum retransmission times is reached, and the data is still incorrect, or it is determined that the HARQ NACK/DTX->ACK error occurs, the receiving end feeds back the HARQ NACK message to the transmitting end, resets the counter, and notifies the upper layer of the receiving end that the HARQ maximum retransmission times is reached, and that the ARQ retransmission is required. After receiving the notification, the upper layer of the receiving end feeds back the ARQ NACK message to the transmitting end according to the feedback algorithm, and instructs the transmitting end to retransmit the data unit. After receiving the message, the upper layer of the transmitting end determines whether to initiate the ARQ retransmission process according to whether the ARQ maximum retransmission times is reached. If the ARQ maximum retransmission times is not reached, the ARQ retransmission process is initiated, otherwise, the ARQ retransmission process is not initiated.

In the embodiment, the present invention provides a technical solution of implementing the data retransmission on the basis of the maximum retransmission time.

The upper layer resource control module, for example the RRC, firstly determines the maximum retransmission time of the HARQ and the ARQ of the transmitting end and the receiving end according to the service characteristics, respectively. A timer is configured on the receiving end for each HARQ process number, for counting the retransmission time. Assuming that the HARQ maximum retransmission time is T, the timer is reset each time when a new data transmission starts, and a counting value is set to be T. If the lower layer of the receiving end determines that the received data is incorrect, the receiving end determines whether the HARQ maximum retransmission time, i.e. the timer is 0, is reached. If the receiving end determines that the HARQ maximum retransmission time is reached, the receiving end transmits the ARQ request message to the transmitting end, so as to trigger the ARQ retransmission process. If the receiving end determines that the HARQ maximum retransmission time is not reached, the receiving end feeds back the HARQ NACK message to the transmitting end, and requests the HARQ retransmission. After detecting the HARQ NACK->ACK error, the receiving end transmits the ARQ request message to the transmitting end, so as to trigger the ARQ retransmission process. If the lower layer of the receiving end determines that the received data unit is correct, the lower layer of the receiving end delivers the data unit to the upper layer of the receiving end, and notifies the transmitting end that the data is correctly received.

The technical solution of implementing the data retransmission by adopting the maximum retransmission time is approximately the same as the technical solution adopting the maximum retransmission times, except for counting the retransmission time instead of counting the retransmission times. Similarly, the HARQ NACK/DTX->ACK errors are avoided from being missed.

In the embodiment, the present invention further provides a data retransmission device 5, which includes a retransmission determining module 51 and a triggering upper layer retransmission module 52.

The retransmission determining module 51 is configured on the receiving end, and is adapted to determine whether the NACK->ACK error occurs in the received data unit, and notify the triggering upper layer retransmission module 52 when the NACK->ACK error occurs.

The triggering upper layer retransmission module 52 is configured on the receiving end, and is adapted to transmit the ARQ request message to the transmitting end after receiving the notification from the retransmission determining module 51.

Figure 5:
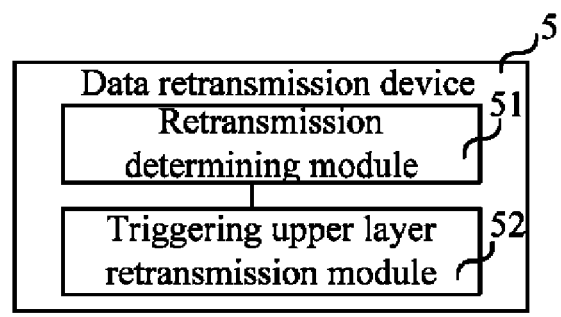
FIG. 5 shows a schematic structural view of a device for retransmitting data according to an embodiment of the present invention.

The triggering upper layer retransmission module 52 may be configured on the lower layer of the receiving end, for example, the HARQ, as shown in FIG. 5.

The function of the triggering upper layer retransmission module may also be implemented by a triggering upper layer retransmission sub-module I and a triggering upper layer retransmission sub-module II.

The triggering upper layer retransmission sub-module I is configured on the receiving end, and adapted to forward the notification to the triggering upper layer retransmission sub-module II of the receiving end, after receiving the notification from the retransmission determining module.

The triggering upper layer retransmission sub-module II is configured on the receiving end, and adapted to transmit the ARQ request message to the transmitting end, after receiving the notification from the triggering upper layer retransmission sub-module I.

To sum up, in the technical solutions provided by the present invention, if the lower layer of the receiving end receives the incorrect data unit and determines that the HARQ retransmission threshold is reached, the lower layer of the receiving end instructs the transmitting end to start the ARQ retransmission instead of simply feeding back the HARQ NACK message to the transmitting end. Therefore, during the final HARQ retransmission process, even the NACK/DTX->ACK occurs, the data retransmission may not be affected.

Further, in the embodiment of the present invention, the receiving end determines whether the HARQ retransmission threshold is reached, and thus the complexity of ARQ operation is lowered, and the retransmission feedback time is reduced. In addition, the present invention provides various specific implementation solutions for the operators to select.

It may be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for retransmitting data, comprising:
receiving, by a receiving end, a Protocal Data Unit;
determining, by the receiving end, whether a Negative Acknowledgement NACK->Acknowledgement (ACK) error occurs; and if the NACK->ACK error occurs, the method further comprises:
transmitting, by a lower layer of the receiving end, a Hybrid Automatic Repeat Request (HARQ) assistant Automatic Repeat Request (ARQ) retransmission request to a transmitting end for requesting the transmitting end to perform an ARQ retransmission; or
notifying, by the lower layer of the receiving end, an upper layer of the receiving end of the occurrence of the NACK->ACK error, and transmitting, by the upper layer of the receiving end, the ARQ request to the transmitting end for requesting the transmitting end to perform the ARQ retransmission.

2. The method according to claim 1, wherein the NACK->ACK error comprises:
receiving, by the receiving end, a received but still incorrect old data unit, transmission of the old data unit having reached a preset, HARQ retransmission threshold; or
receiving, by the receiving end, a new data unit, and a previous data unit not having been correctly received, transmission of the previous data unit not having reached a preset HARQ retransmission threshold.

3. The method according to claim 2, wherein the preset HARQ retransmission threshold comprises preset HARQ maximum retransmission times or HARQ maximum retransmission time.

4. The method according to claim 1, further comprising:
feeding back, by the receiving end, an HARQ acknowledgement to the transmitting end for each data unit; and
counting, by the transmitting end, number of negative acknowledgement, and feeding back, by a lower layer of the transmitting end, a corresponding local ARQ acknowledgement to an upper layer when a preset duration is exceeded, under the situation of reaching a corresponding HARQ retransmission threshold or receiving the ACK.

5. The method according to claim 1, wherein the lower layer of the receiving end includes the HARQ of the receiving end; and the upper layer of the receiving end includes the ARQ of the receiving end.

6. The method according to claim 1, wherein if the receiving end determines that the NACK->ACK error does not occur, and the data unit is correct, the method further comprises:
delivering, by the lower layer of the receiving end, the correct data unit to an upper layer of the receiving end, and feeding back a message indicating that data unit is correctly received to the transmitting end.

7. The method according to claim 6, wherein the feeding back, by the receiving end, the message of the data unit correctly received to the transmitting end comprises:
feeding back, by the lower layer of the receiving end, an HARQ ACK signaling to the transmitting end, and feeding back, by the upper layer of the receiving end, an ARQ ACK signaling to the transmitting end according to an ARQ feedback algorithm; or
feeding back, by the lower layer of the receiving end, an HARQ ACK message to the transmitting end; after the transmitting end receives the message, if an HARQ assistant ARQ retransmission message transmitted by the lower layer of the receiving end is not received in a preset time duration, determining that the data unit is correctly received, and feeding back a local ARQ ACK signaling to the upper layer of the transmitting end.

8. A device for retransmitting data, comprising:
a retransmission determining module configured in a receiving end, and configured to determine whether a Negative Acknowledgement (NACK)->Acknowledgement (ACK) error occurs in a received data unit, and notify a triggering upper layer retransmission module when the NACK->ACK error occurs; and
the triggering upper layer retransmission module comprises a triggering upper layer retransmission sub-module I and a triggering upper layer retransmission sub-module II, wherein
the triggering upper layer retransmission sub-module I, configured to forward a notification to a triggering upper layer retransmission sub-module II of the receiving end, after receiving the notification from the retransmission determining module; and
the triggering upper layer retransmission sub-module II, configured to transmit an upper layer Automatic Repeat Request (ARQ) request message to the transmitting end after receiving the notification from the triggering upper layer retransmission sub-module I.

9. The device according to claim 8, wherein the NACK->ACK error comprises:
receiving, by the receiving end, a received but still incorrect old data unit, transmission of the old data unit having reached a preset Hybrid Automatic Repeat Request (HARQ) retransmission threshold; or
receiving, by the receiving end, a new data unit, and a previous data unit not having been correctly received, transmission of the previous data unit not having reached a preset HARQ retransmission threshold.

10. The device according to claim 8, wherein the triggering upper layer retransmission sub-module I is configured on a lower layer of the receiving end; and the triggering upper layer retransmission sub-module II is configured on upper layer of the receiving end.

11. A method for retransmitting data, comprising:
determining, by a Hybrid Automatic Repeat Request (HARQ) of a receiving end, whether a protocol data unit (PDU) is an old data unit in response to receiving data transmitted by an transmitting end;
determining, by the HARQ of the receiving end, whether the PDU is correct if the PDU is the old data unit;
determining, by the HARQ of the receiving end, whether a maximum retransmission time or an HARQ maximum retransmission time is reached if the PDU is incorrect; and
transmitting, by a ARQ of the receiving end, an ARQ retransmission request to an ARQ of the transmitting end in response to the HARQ reaching the maximum retransmission time or the HARQ maximum retransmission time; and
instructing the ARQ of the transmitting end to retransmit ARQ data.

* * * * *